W. D. MENDENHALL.
Plow.
No 65,412. Patented June 4, 1867
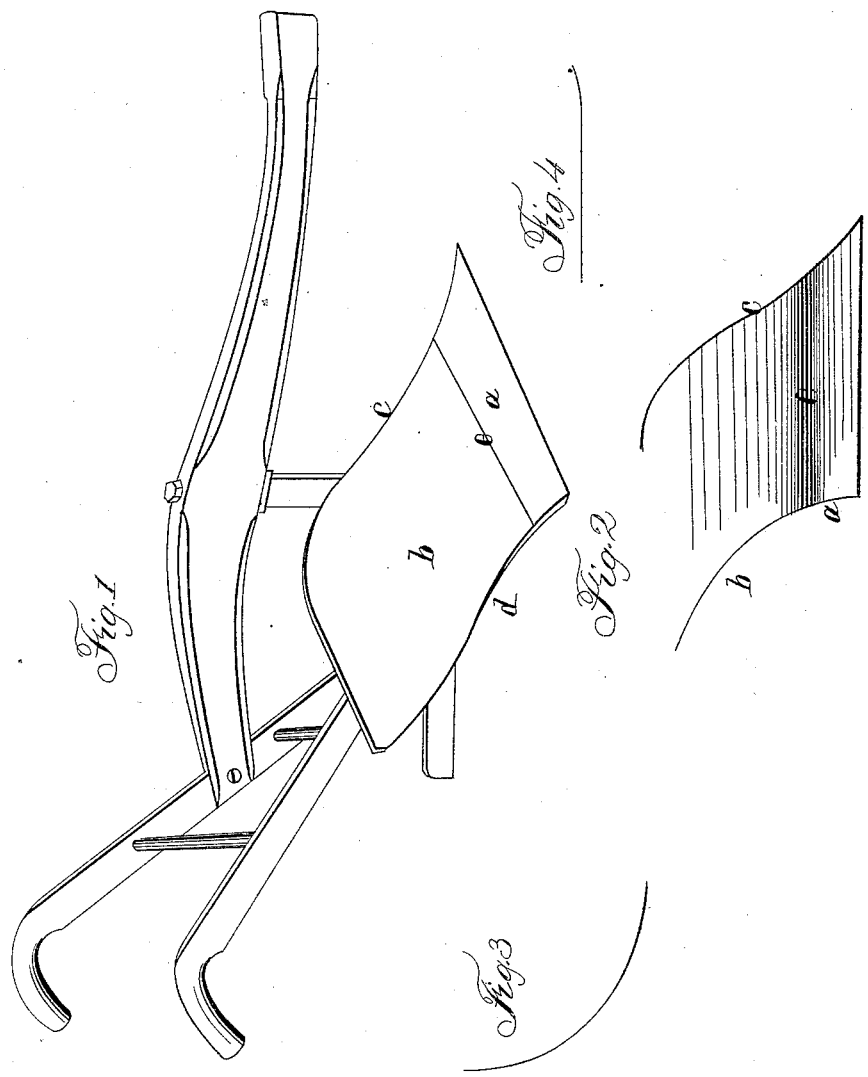
Witnesses:
W. H. Haskell
W. C. Whitehead
Inventor:
William D. Mendenhall

UNITED STATES PATENT OFFICE.

WILLIAM D. MENDENHALL, OF FARMINGTON, ILLINOIS.

PLOWSHARE.

Specification forming part of Letters Patent No. 65,412, dated June 4, 1867.

*To all whom it may concern:*

Be it known that I, WILLIAM D. MENDENHALL, formerly of Bloomington, but now of Farmington, Fulton county, and State of Illinois, have invented a new and useful Improvement in Making the Share and Mold-Board of any ordinary Ground-Plow; and I do hereby declare that the following is a full, clear, and exact description of the construction and operation of the same, reference being had to the annexed drawings, making a part of this specification, in which—

Figure 1 is a perspective view. Fig. 2 is a front elevation of share and mold-board. Fig. 3 shows the ordinary concavity of share and mold-board parallel to the breast of plow. Fig. 4 shows one line of concavity claimed as novel and useful, it being nearly parallel to cut of plowshare, and is intended to be substantially the same as the lines on face of Fig. 2.

The nature of my invention consists in making the share and mold-board, one or both of them, concave in a line parallel to the joint $e$ between them or to cut of share $a$. I give this concavity any desirable radius and extent, but make it chiefly near the breast or shin of the plow, as shown by lines drawn across the face of Fig. 2, intended to show a slight concavity extending from the breast $c$ toward the opposite side $d$, Fig. 1. By this manner of forming the share and mold-board I am enabled to resist the tendency of the earth to fall to the "land-side," as well as partially to prevent the rapid wearing away of the breast toward the land-side. The plow likewise runs more easily.

What I claim as my invention, and desire to secure by Letters Patent, is—

The method of forming or shaping any plowshare or mold-board, or both combined, with a concave surface of any desired radius and area, extending from the breast $c$ of the plow toward the opposite side $d$, or in a line parallel, or nearly so, to the cut of the share; and I do not claim the ordinary concave that extends in an opposite direction from that here claimed, or parallel with the breast of the plow.

WILLIAM D. MENDENHALL.

Witnesses:
W. H. HASKELL,
W. C. WHITEHEAD.